United States Patent [19]
Koral et al.

[11] 3,981,531
[45] Sept. 21, 1976

[54] VEHICLE BODY SUNROOF

[75] Inventors: Joseph F. Koral, Sterling Heights; Daniel L. Beaufait, Birmingham, both of Mich.

[73] Assignee: General Motors Corporation, Detroit, Mich.

[22] Filed: Sept. 15, 1975

[21] Appl. No.: 613,533

[52] U.S. Cl. ............................... 296/137 G; 49/360
[51] Int. Cl.² ............................................. B60J 7/10
[58] Field of Search ......... 296/137 G, 137 E, 137 F, 296/137 H; 49/360

[56]     References Cited
         UNITED STATES PATENTS

| | | | |
|---|---|---|---|
| 3,055,701 | 9/1962 | Golde et al. | 296/137 G |
| 3,545,806 | 12/1970 | Ventre | 296/137 G |
| 3,737,194 | 6/1973 | Lutz | 296/137 E |
| 3,829,155 | 8/1974 | Lutz | 296/137 F |
| 3,863,979 | 2/1975 | Bienert | 296/137 G |

*Primary Examiner*—Robert R. Song
*Attorney, Agent, or Firm*—C. E. Leahy

[57]     ABSTRACT

An operating mechanism for a roof opening closure panel includes a track extending longitudinally of the vehicle. A roller and a lifting link are respectively pivotally attached to the leading end and trailing end of the closure panel and are captured for sliding movement in the track. A ramp member is slidably captured in the track intermediate the roller and the lifting link and has an inclined surface which lifts the roller vertically when the ramp member is forced beneath the roller. A connecting rod extends between the ramp member and the trailing end of the lifting link to provide a fixed length therebetween. A drive cable is connected to the trailing end of the lifter link for moving the lifter link fore and aft in the track. When the closure panel reaches its full forward position its forward movement is stopped and continued forward movement of the trailing end of the lifter link by the drive cable causes the leading end of the lifter link to be moved vertically to thereby lift the trailing end of the closure panel vertically. This further forward movement of the trailing end of the lifter link also moves the connecting rod and ramp member forwardly to drive the ramp member beneath the front roller thereby lifting the leading end of the closure panel simultaneous with the vertical lifting of the trailing end of the closure panel.

3 Claims, 6 Drawing Figures

VEHICLE BODY SUNROOF

The invention relates to a vehicle body sunroof and more particularly provides a closure panel operating mechanism in which the final closing motion of the panel is by vertical movement of the closure to compress a seal without any component of horizontal movement so that the seal is not scuffed.

It is known to provide a vehicle body roof panel having a roof opening which is selectively opened and closed by a closure panel. Such closure panels are conventionally operated by a track assembly which moves the closure panel fore and aft between opened and closed positions. The track assembly is usually inclined so that the closure panel is stored beneath the roof panel when the closure panel is in its aft or open position and rises vertically as it moves forwardly so that in the closed position the closure panel is flush with the vehicle roof panel. A compressible seal structure is conventionally provided on either the roof panel or the closure panel and is compressed between the panels as the closure panel reaches its closed position.

A disadvantage of the prior art closure panel operating mechanisms is that the closure panel moves both vertically and horizontally as the fully closed position is approached so that the compressible seal is scuffed. Scuffing of the seal causes it to wear and also substantially increases the effort required to move the closure panel to its fully closed position with the seal fully compressed to effectively prevent leakage of water into the passenger compartment.

The present invention features an improved closure panel operating mechanism for moving the closure panel between open and closed positions and in which the final closing movement of the closure panel has a purely vertical component so as to effect improved sealing between the closure panel and the roof panel.

According to the invention a vehicle body has a roof panel with an opening defined by a downwardly facing flange. A closure panel is adapted for closure of the roof opening and has a peripherally extending upward facing flange which carries a compressible seal adapted for compressive sealing engagement against the downwardly facing flange of the roof panel when the closure panel is in the closed position. Operating mechanism for the closure panel includes a track extending longitudinally of the vehicle on each side of the opening. Each track has a roller attached to the leading end of the closure panel. A lifting link is located in the track rearward of the roller and has a leading end pivotally connected to the trailing end of the closure panel. A ramped member is slidably captured in the track intermediate the roller and the lifting link and has an inclined surface engageable with the roller to lift the roller vertically when the ramp member is driven beneath the roller. A connecting rod extends between the ramp member and the trailing end of the lifting link to provide a fixed length therebetween. A drive cable is connected to the trailing end of the lifter link for moving the lifter link fore and aft in the track. An adjustable stop is provided at the forward end of the track to be engaged by the front roller and thereby stop forward movement of the closure panel when it reaches its full forward position. When the closure panel is stopped, continued forward movement of the trailing end of the lifter link by the drive cable causes the leading end of the lifter link to be moved vertically to thereby lift the trailing end of the closure panel vertically. This further forward movement of the trailing end of the lifter link also moves the connecting rod and ramp member forwardly to drive the ramp member beneath the front roller, thereby lifting the leading end of the closure panel vertically. Thus, the final closing motion of the closure panel is vertical without any component of horizontal motion so that the compressible seal carried by the closure panel is vertically compressed without being scuffed.

These and other features, objects and advantages of the invention will become apparent upon consideration of the specification and the appended drawings in which.

Figure 1:
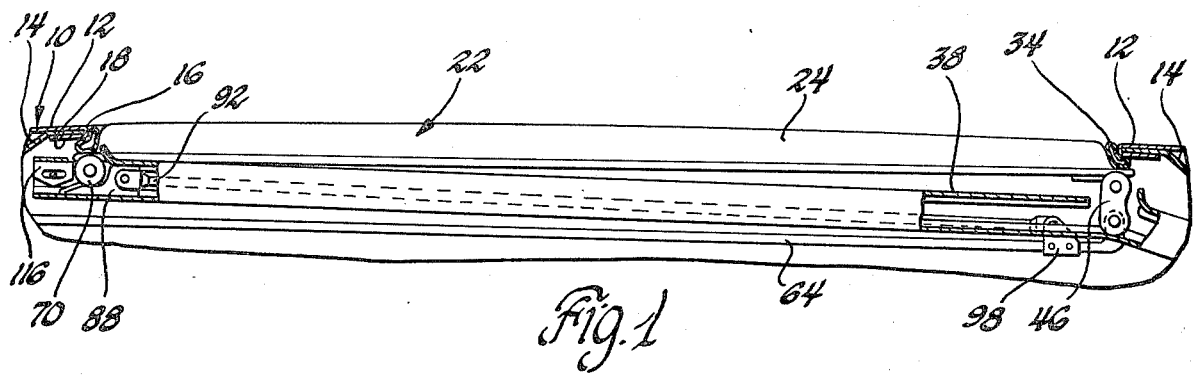
FIG. 1 is a sectional side elevation view showing the closure panel in closed position.

Referring to FIG. 1, a vehicle body roof structure indicated generally at 10 includes an outer panel 12 and an inner panel 14. A roof opening 16 is provided in the roof structure 10 by a flange structure 18 of the outer roof panel 12 which is folded over the inner panel 14 and faces downwardly into the vehicle passenger compartment.

Figure 4:
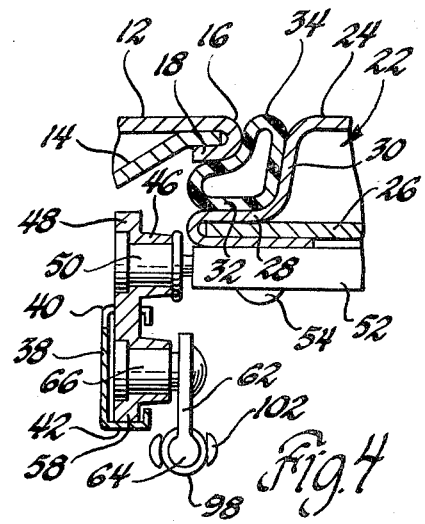
FIG. 4 is a sectional view taken in the direction of arrows 4—4 of FIG. 3.

A closure panel, indicated generally at 22, includes an outer panel 24 and an inner panel 26 as best shown in FIG. 4. The outer panel 24 has an inwardly offset flange portion 28 which extends peripherally about the closure panel 22. The flange portion 28 includes a vertically extending leg 30 and a horizontally extending leg 32 which seat a compressible elastomeric seal 34 which is adapted for compressive sealing engagement against the flange structure 18 of the vehicle body roof structure 10 when the closure panel 22 is in the closed position of FIG. 1. As seen in FIG. 4, the flange structure 18 of the vehicle body roof structure 10 overlies the flange portion 28 so that the closure panel 22 cannot be ejected from the vehicle body.

Figure 2:
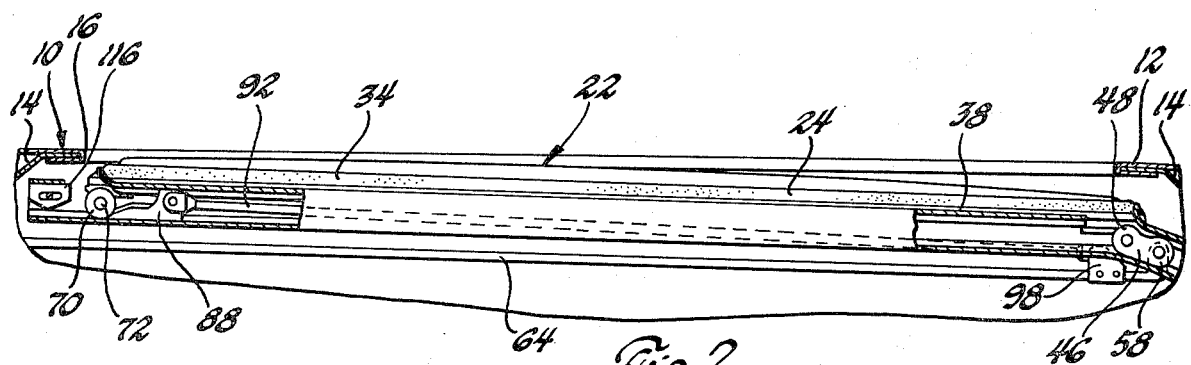
FIG. 2 is a view similar to FIG. 1 showing the closure panel just prior to the closed position.

A closure panel operating mechanism is provided for moving the closure panel 22 between its closed position of FIG. 1, a vertically lowered position of FIG. 2, and a rearwardly retracted open position, not shown. The closure panel operating mechanism includes a pair of tracks which extend longitudinally of the vehicle along each side of the roof opening 16 and are conventionally attached to the vehicle body roof structure 10. The drawings show only the track 38 which would be provided along the driver's side of the roof opening 16, it being understood that an identical track and closure panel operating mechanism would be provided along the passenger's side of the roof opening 16. As best seen in FIGS. 3 – 6, the track 38 is channel shaped and has an upper flange 40 and a lower flange 42.

Figure 3:
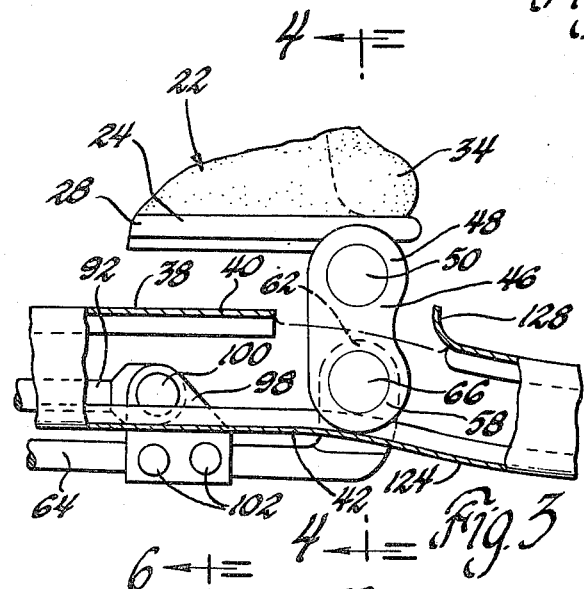
FIG. 3 is an enlarged fragmentary view of the rearward end of the closure panel operating mechanism as shown in FIG. 1.

Referring to FIGS. 3 and 4, it will be seen that the trailing edge of the closure panel 22 is supported by a lifter link 46 having its leading end 48 pivotally connected to the closure panel 22 by a pivot 50 and a mounting arm 52 which is attached to the closure panel 22 as by rivets 54. The trailing end 58 of the lifter link 46 has a rounded configuration which slidably rides in the track 38. The trailing end 58 of the lifter link 46 is pivotally connected to an upstanding arm 62 of a drive rod 64 by a pivot 66.

Figure 5:
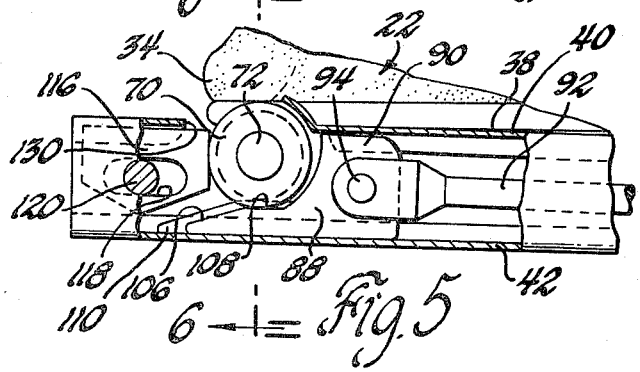
FIG. 5 is a fragmentary enlarged view of the forward end of the closure panel operating mechanism as shown in FIG. 1.
Figure 6:
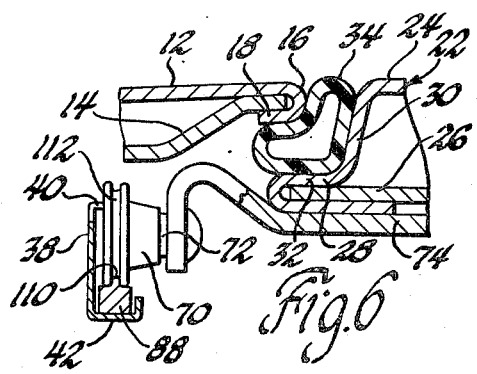
FIG. 6 is a sectional view taken in the direction of arrows 6—6 of FIG. 5.

Referring to FIGS. 5 and 6, it will be seen that the leading edge of the closure panel 22 is supported by a roller 70 which is captured in the track 38 and is pivotally connected to the closure panel 22 by a pivot shaft 72 and a mounting arm 74.

The closure panel operating mechanism also includes a ramp member 88 which is slidably captured in the track 38 intermediate the roller 70 and the lifter link 46. As best seen in FIG. 5, the ramp member 88 includes a body portion 90 which is maintained at a fixed distance ahead of the trailing end 58 of the lifter link 46 by a connecting rod 92. As seen in FIG. 5, the forward end of the connecting rod 92 is connected to the body portion 90 of ramp member 88 by a pivot 94. As seen in FIG. 3, the rearward end of connecting rod 92 is connected to a mounting bracket 98 by a pivot 100. The mounting bracket 98 is in turn attached to the drive rod 64 by rivets 102. The ramp member 88 has an inclined surface 106 and a dwell surface 108. As best seen in FIGS. 5 and 6 the inclined surface 106 and dwell surface 108 are configured to provide a tongue 110 which is engageable in a mating groove 112 in the peripheral surface of the roller 70. As best seen in FIG. 6, the inner engagement between the tongue 110 and groove 112 is effective to retain the roller 70 in the track 38 even when the roller 70 is lifted above the confines of the lower flange 42 of track 38.

A stop member 116 is mounted in the track 38 and has an elongated slot 118 which receives a bolt 120 to permit fore and aft adjusting movement of the stop member 116. The stop member 116 is engageable by the roller 70 to stop forward sliding movement of the roller 70 and thus limit the forward movement of the closure panel 22.

Referring to FIGS. 1 and 2, it will be seen that the track 38 is mounted in the vehicle body at a slight incline so that the leading end of the track 38 is somewhat closer to the roof opening 16 than is the case at the trailing end of the closure panel 22. As best seen in FIGS. 1 and 3, the track 38 has a more steeply inclined section at 124 which moves the closure panel 22 further downwardly to permit its withdrawal to the fully retracted open position, not shown.

OPERATION

Referring to FIG. 2, the closure panel 22 is shown just prior to reaching the closed position. The leading end of the closure panel 22 is supported by the roller 70 which is captured in track 38. The trailing end of the closure panel 22 is supported by the lifter link 46 which has its leading end 48 pivotally connected to the closure panel 22 and has its trailing end 58 pivotally connected to the drive rod 64. The drive rod 64 is moved fore and aft by a conventional cable drive system, not shown. The ramp member 88 follows closely behind the roller 70 and at a predetermined fixed distance from the trailing end of the lifter link 46 as determined by the connecting rod 92.

As the closure panel 22 progresses forwardly from its position of FIG. 2, the roller 70 engages the stop member 116, thereby preventing further forward movement of the roller 70 and the closure panel 22. The leading end 48 of the lifter link 46 is also stopped from further forward movement because it is connected to the closure panel 22. Further forward driving movement of the drive rod 64 forces the trailing end of the lifter link 46 to move forwardly along the inclined section 124 of the track 38 and results in the leading end 48 being moved vertically to accommodate the forward movement of the rearward end 58. As best seen in FIG. 3, the upper flange 40 of the track 38 is cut away at 128 to accommodate upward movement of the leading end 48 of the lifter link 46 out of the track 38. As the lifter link 46 moves vertically from its position of FIG. 2 to its position of FIGS. 1 and 3, the ramp member 88 is moved forwardly by the connecting rod 92. As the ramp member 88 is moved forwardly by the connecting rod 92, inclined surface 106 causes the roller 70 to be moved vertically until the dwell surface 108 is engaged beneath the roller 70 to hold the roller 70 and the closure panel 22 in the raised position. The upper flange 40 of track 38 is cut away at 130 to allow this upward movement of roller 70.

Thus, it is seen that the closure panel operating mechanism functions to carry the closure panel forwardly and then to stop the closure panel against further forward movement. The leading and trailing ends of the closure panel are then raised vertically at the same time and without any further component of horizontal motion so that the compressible elastomeric seal 34 is compressed vertically into watertight sealing engagement between the vehicle roof flange structure 18 and the flange portion 28 of the closure panel 22.

The closure panel is moved to open position by rearward movement of the drive rod 64 which pulls the trailing end 58 of the lifter link 46 along the track thereby causing the link 46 to again assume its horizontal position of FIG. 2. The track 38 has an integral upturned portion 128 which is engageable with the leading end 48 of the lifter link 46 to assure that the lifter link 46 pivots about the pivot 66 so as to lower the trailing end of the closure panel 22. As the trailing end 58 of lifter link 46 is retracted rearwardly, the connecting rod 92 also withdraws the ramp member 88 from beneath the roller 70 to lower the leading end of closure panel 22 vertically. Continued rearward motion of the drive rod 64 by the conventional drive cable system effects rearward sliding movement of the closure panel 22 to its rearwardly retracted position, not shown.

Although the drawings and the foregoing description relate to a closure panel operating mechanism wherein the roller is located at the leading edge of the closure panel and the lifter link is located at the trailing end thereof, one skilled in the art will appreciate that these parts could be reversed. For example, the roller could be located at the trailing end and the lifter link at the forward end in which case the ramp member would be located just rearwardly of the roller.

What is claimed is:

1. In a vehicle body having a roof panel with an opening defined by a downwardly facing flange and a closure panel having a peripheral flange for sealing engagement with the downwardly facing flange of the roof panel to close the opening, a closure panel operating mechanism for moving the closure panel between open and closed positions and comprising: a track extending longitudinally of the vehicle, mounting means at one end of the closure panel and captured for fore and aft movement within the track, stop means for limiting forward movement of the closure panel, a lifter link having a leading end and a trailing end with the leading end being pivotally connected to the other end of the closure panel, means pivotally mounting the trailing end of the lifter link on the track for fore and aft movement, drive means connected to the trailing end of the lifter link for moving the lifter link fore and aft in the track, a ramp member slidably engaged in the track rearwardly of the mounting means and captured for fore and aft movement in the track, the ramp member having an inclined surface engageable with the mounting means to lift the mounting means and the one end of the closure panel vertically when the ramp member is driven beneath the mounting means, and a connecting rod attached to the ramp member and providing a fixed length between the ramp member and the trailing end of the lifter link whereby upon forward movement of the trailing end of the lifter link subsequent to the closure panel being stopped from further forward movement by the stop means, the leading end of the lifter link moves vertically to lift the other end of the closure panel vertically into sealing engagement of the flange while the connecting rod drives the ramp member beneath the mounting means causing the inclined surface to lift the mounting means and one end of the closure panel vertically, thereby lifting the closure panel vertically to carry the peripheral flange of the closure panel into sealing engagement with the downwardly facing flange of the roof panel.

2. In a vehicle body having a roof panel with an opening defined by a downwardly facing flange, a closure panel having a peripheral flange, a compressible seal carried by one of the flanges for sealing engagement with the other flange when the closure panel closes the opening, a closure panel operating mechanism for moving the closure panel between open and closed positions comprising: a track extending longitudinally of the vehicle; a roller pivotally mounted on the leading end of the closure panel and captured for fore and aft movement within the track; stop means on the track for limiting forward movement of the roller; a lifter link captured for sliding movement in the track and having a leading end and a trailing end with the leading end being pivotally connected to the trailing end of the closure panel; drive means connected to the trailing end of the lifter link for moving the lifter link fore and aft in the track; a ramp member slidably captured in the track rearwardly of the roller and having an inclined surface engageable with the roller to lift the roller and the leading end of the closure panel vertically when the ramp member is driven beneath the roller; and a connecting rod attached to the ramp member and providing a fixed length between the ramp member and the trailing end of the lifter link whereby upon forward movement of the trailing end of the lifter link subsequent to the closure panel being stopped from further forward movement by the stop means, the leading end of the lifter link moves vertically to lift the trailing end of the closure panel vertically while the connecting rod drives the ramp member beneath the roller causing the inclined surface to lift the roller and the leading end of the closure panel vertically, thereby lifting the closure panel vertically to compress the compressible seal between the peripheral flange of the closure panel and downwardly facing flange of the roof panel.

3. In a vehicle body having a roof panel with an opening defined by a downwardly facing flange, a closure panel having a peripheral flange, a compressible seal carried by one of the flanges for sealing engagement with the other flange when the roof panel closes the opening, a closure panel operating mechanism for moving the closure panel between open and closed positions comprising: a track extending longitudinally of the vehicle; a roller pivotally mounted on the leading end of the closure panel and captured within the confines of the track for fore and aft movement in the track; said roller having a rolling surface engaging the track and a circumferentially extending groove in the rolling surface; stop means on the track for limiting forward movement of the roller; a lifter link captured for sliding movement in the track and having a leading end and a trailing end with the leading end being pivotally connected to the trailing end of the closure panel; drive means connected to the trailing end of the lifter link for moving the lifter link fore and aft in the track; a ramp member slidably captured in the track rearwardly of the roller and having an inclined surface engageable with the roller to lift the roller and the leading end of the closure panel vertically when the ramp member is driven beneath the roller; an opening in the track permitting the roller to be lifted vertically beyond the confines of the track; a tongue on the inclined surface of the ramp member adapted for engagement in the groove of the roller to interconnect the track and the roller when the ramp member lifts the roller vertically beyond the confines of the track; and a connecting rod attached to the ramp member and providing a fixed length between the ramp member and the trailing end of the lifter link whereby upon forward movement of the trailing end of the lifter link subsequent to the closure panel being stopped from further forward movement by the stop means, the leading end of the lifter link moves vertically to lift the trailing end of the closure panel vertically while the connecting rod drives the ramp member beneath the roller causing the inclined surface to lift the roller and the leading end of the closure panel vertically, thereby lifting the closure panel vertically to compress the compressible seal between the peripheral flange of the closure panel and downwardly facing flange of the roof panel.

* * * * *